May 1, 1934.  T. J. W. TYSON  1,956,633

REENFORCING MEANS FOR TIRE COVERS

Filed Nov. 22, 1930  2 Sheets-Sheet 1

Inventor
Theodore J. W. Tyson.
by
Attys.

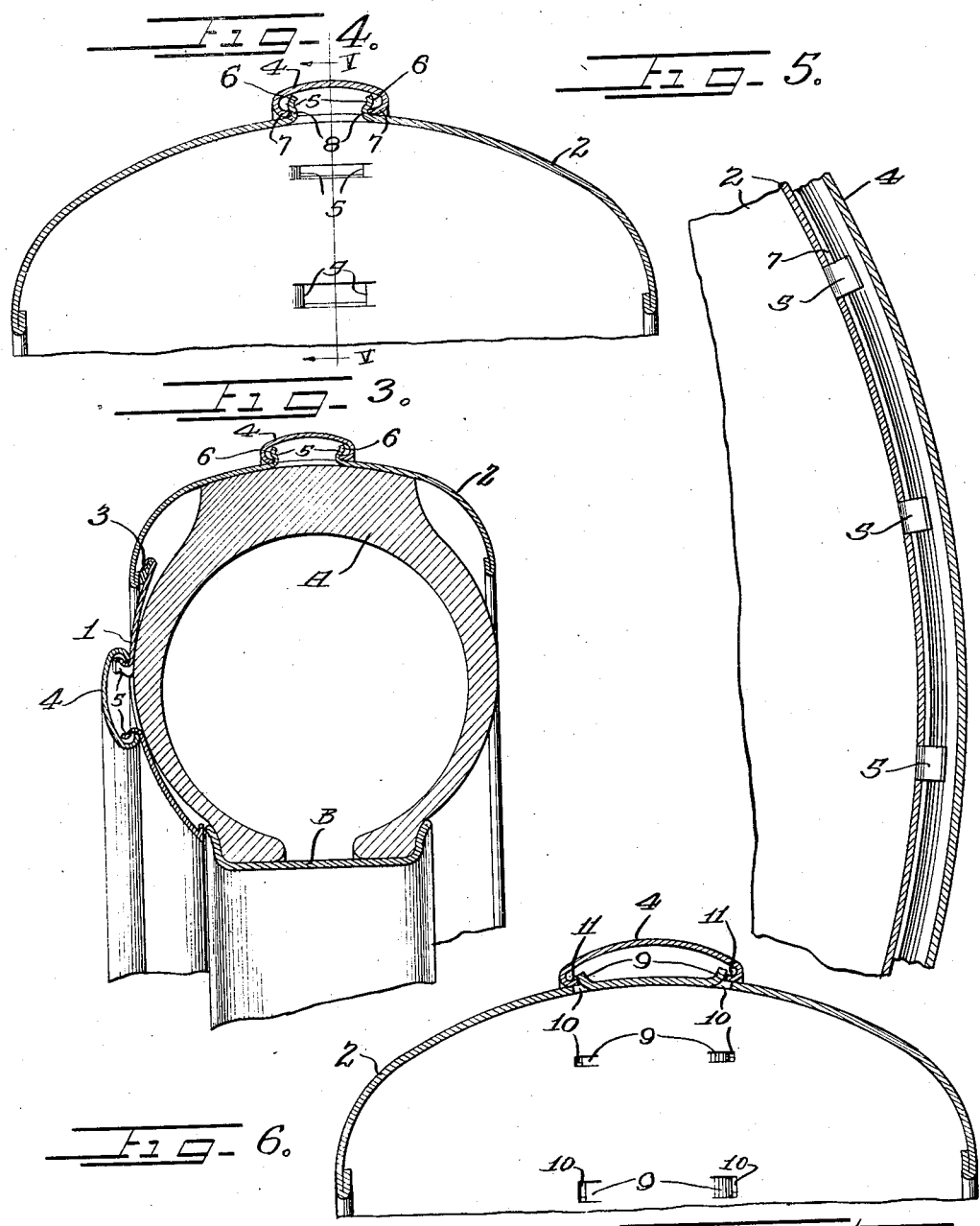

Patented May 1, 1934

1,956,633

UNITED STATES PATENT OFFICE 1,956,633

REENFORCING MEANS FOR TIRE COVERS

Theodore J. W. Tyson, Detroit, Mich., assignor to Lyon Cover Company, Detroit, Mich., a corporation of Michigan Application November 22, 1930, Serial No. 497,435

9 Claims. (Cl. 150—54)

This invention relates to tire covers.

One of the principal objects of the invention is to provide, in connection with tire covers of the character employing a flexible or resilient member adapted for disposition on a spare tire, stiffening means to resist excessive flexing or deformation of such member.

A further object of the invention resides in employing a relatively narrow strip secured to a tire cover to accentuate the beauty thereof.

A further object of the invention resides in employing novel means for attaching a stiffening or reenforcing device to a tire cover member.

Another object lies in a novel method of attaching the molding to a cover or other support.

In carrying the invention into practice, the tire cover member or members is or are provided with molding or beading which may be centrally located on the members or may be disposed along the rims or edges thereof, the beading or molding being securely fastened in place. At least one member of the cover is made preferably of spring metal, or is at least flexible and it is highly desirable that the metal be as thin as possible for the sake of lightness and low cost of manufacture. Thus with the stiffening means forming the subject matter of the present invention, it is possible to attain a rigidity which would not be possible in the absence of some form of stiffening means, unless a metal of substantially greater thickness were used for the tire cover member.

More particularly, in accordance with the present invention, a circumferential series of outwardly punched or stamped tongues integral with each tire cover member are arranged so that they form cam or securing elements, and a strip of preferably resilient metal or other molding or beading of substantially C-shape in cross section is snapped over said elements and held in place adjacent the tire cover member by its own resilience, as well as by said elements.

Other and further important objects and advantages of this invention will be apparent from the disclosure in the specification and the accompanying drawings.

This invention (in a preferred form) is illustrated in the drawings and hereinafter more fully described.

On the drawings:

Figure 3 is an enlarged fragmentary transverse sectional view of a tire and tire cover embodying the invention.

Figure 4 is an enlarged fragmentary sectional view of one of the tire cover members embodying the present invention.

Figure 5 is a fragmentary sectional view taken approximately in the plane indicated by the line V—V in Figure 4.

Figure 6 is a view similar to Figure 4, but showing a modified form of the invention.

Figure 1:
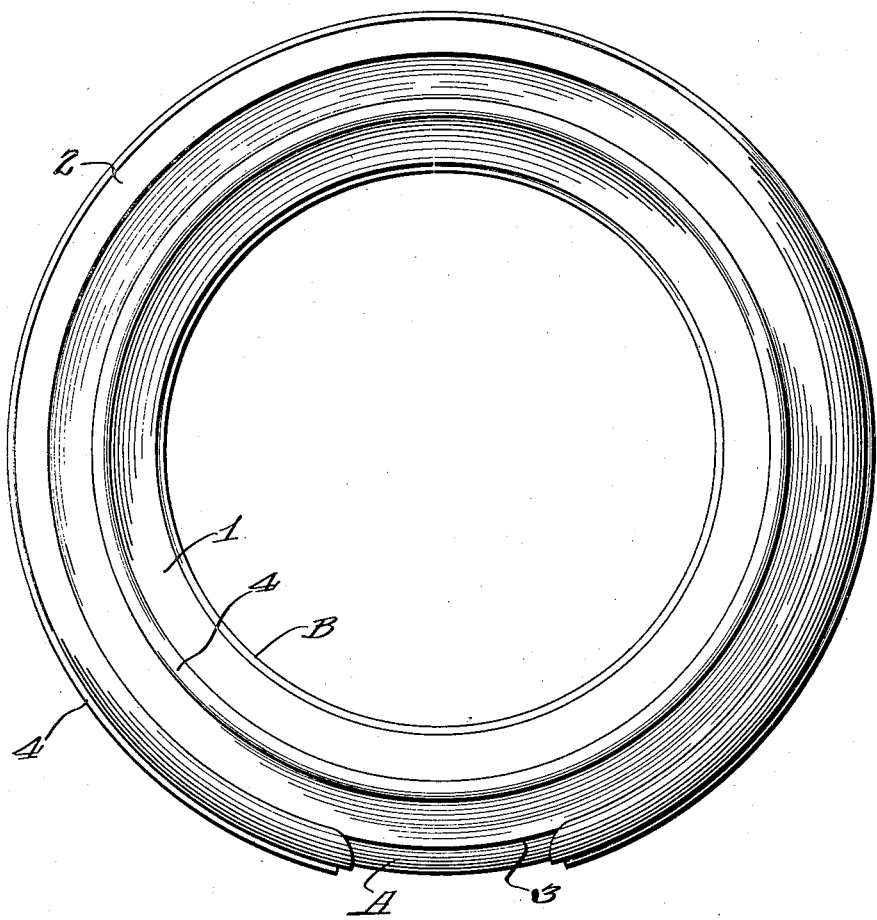
Figure 1 is an elevational view showing the improved tire cover applied to a tire.

Referring now more particularly to the drawings, wherein the same reference characters indicate identical parts, the tire A is mounted on a rim B as shown having mounted thereon a tire cover of the character contemplated by the invention and comprising a metallic side plate 1 adapted for engagement with the side wall of the tire as shown, and a resilient metallic split ring member 2 engaging the tread of the tire A and also the rubber bead 3 which is secured to the outer rim of the side plate 1. The resilience of the ring member 2 serves not only to maintain itself, but the side plate 1 as well, in tight contact with the tire.

Figure 2:
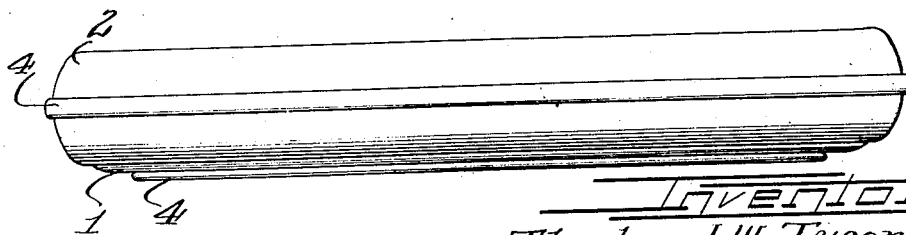
Figure 2 is a top plan view of the same.

For the purpose of stiffening the members 1 and 2 a bead or molding 4 is applied to the member 1 intermediate its inner and outer peripheries, and to the outer ring member 2 intermediate the longitudinal edges thereof. If desired, the bead may be located along one or both edges of the members 1 and 2, and it is to be appreciated that the showing in Figures 1 and 2 of the centrally located bead or molding is for the purpose of illustration only.

In the form of the invention shown in Figures 3, 4, and 5, the molding 4 is held in place by means of cam elements, preferably integral with and struck out from the metal of the side plate 1 and outer ring 2. In this form of the invention, at points spaced circumferentially along each cover member, H-cuts are made, the juxtaposed tongues 5 thus formed being forced substantially radially outwardly and then formed with cam surfaces 6. The inwardly extending portions 7 of the molding 4 are normally separated apart a distance slightly less than the maximum normal distance between the cam surfaces 6 of the tongues 5, and also somewhat less than the normal distance between the neck portions 8 of the tongues 5. Thus, in applying the molding 4 to the tire cover members, it is necessary to force the same along the cam surfaces 6 and beyond the latter until the portions 7 snap into engagement with the neck portions 8 of the cam elements 5, the resilience of the molding 4 not only preventing accidental separation of the molding 4 from the cover members, but serving also to prevent rattling therebetween.

It will be noticed in connection with the form of the invention shown in Figures 3, 4 and 5, that, if desired, a suitable implement or implements may be applied to the tongues 5 after the molding 4 has been applied, to spread said tongues permanently and thereby further insure against removal of the molding 4.

In the somewhat modified form of the invention illustrated in Figure 6, the cam elements or tongues 9 are formed from substantially U-shaped cuts 10 in pairs circumferentially along each cover member, the tongues extending away from each other, in contra-distinction to the form of the invention shown in Figures 3, 4 and 5, wherein the tongues 5 extend toward each other. The relationship of the edges 11 of the molding 4 in the form shown in Figure 6 to the cam elements 9 is substantially the same as that above set forth in connection with the form of the invention appearing in Figures 3, 4 and 5, and the molding 4 is applied substantially in the same manner. It will be noted that the openings or cuts 10 in Figure 6 are concealed by the portions 11 of the molding 4, thereby precluding the entry of foreign matter and presenting a pleasing appearance.

It will be appreciated that the cam elements or tongues serve not only to retain the molding 4 in position with respect to the tire cover members, but also serve to prevent lateral shifting of the molding.

The tire cover members are susceptible of being coated with paint or enamel or with chromium or the like in order to enhance the appearance thereof. The molding 4 is preferably also coated, and has been found to add very materially not only to the beauty of the tire cover, which in itself is of a very pleasant appearance, but of the automobile in connection with which the tire cover is used.

While the edges of the molding 4 are shown as being in substantial contact with the tire cover members, it is to be understood that, if desired, such edges may be somewhat spaced from the members in connection with which they are used.

It is to be understood that the invention is susceptible of use in connection with tire covers whose constituent parts are not necessarily resilient, but may be flexible and substantially non-resilient. Moreover, while in Figure 1, the molding or beading is shown as extending throughout the whole length of the outer ring 2, it is to be appreciated that such construction is adapted particularly for use in connection with rear mountings of automobiles, and that, where the invention is to be used in connection with a spare tire which is mounted in a fender well, for example, of a car, the beading may be made of a length commensurate with the portion of the cover which is exposed above the fender well. Thus the molding will not interfere with the proper fit of the tire cover in the well.

It is further to be noted that the tongues 5 and 9 may be stiff or resilient and the molding 4 may be correspondingly resilient or stiff, as desired, since in one case the resilience of the molding 4 will provide for the snapping of the marginal portions of the molding over stiff tongues, and in the other case the resilence of the tongues will permit stiff molding to snap over the same.

The molding may be preformed to substantially the shape it is to have when applied to the parts of the tire cover, or it may be in the form of a straight strip to which its final shape is imparted during the process of applying the same to the cover parts.

I am aware that many changes may be made, and numerous details of construction may be varied through a wide range without departing from the principles of this invention, and I, therefore, do not purpose limiting the patent granted hereon otherwise than necessitated by the prior art.

I claim as my invention:

1. The method of applying a strip of substantially C-shaped molding to a surface having one or more slots from whose ends tongues project, which comprises placing the strip with its edges flanking said tongues and then spreading said tongues until the latter overlie said edges.

2. The method of applying a strip of substantially C-shaped molding to a surface having one or more slots from whose ends tongues project, which comprises placing the strip with its edges flanking said tongues, inserting a tool through said slot, and applying said tool to each tongue to force the latter to overlie each edge of the strip.

3. A split longitudinally resilient ring-like tire cover member of thin sheet metal, and a strip for stiffening said member to impart thereto the resilient characteristics of a relatively thick sheet metal member, the first member having struck up retaining means and said strip having spaced edges disposed between and engaged by said means and said member.

4. A longitudinally resilient thin sheet metal member for use as a tire cover, and means for stiffening said member to impart thereto the resilient characteristics of a relatively thick sheet metal member, said member having integral tongues projecting away from the axis of the member and also away from the median plane of the member, said means having edges located in the pockets afforded by said tongues and the body of said member whereby said means is capable of movement relative to said member upon expansion and contraction of the latter.

5. A flexible tire cover member of thin sheet metal adapted to be expanded and contracted as the same is applied to and removed from a tire, and means for stiffening said member to impart thereto resilient characteristics not inherent in said member, said means comprising a resilient bead having spaced longitudinal edges, said cover member having pairs of spaced slots arranged in a longitudinal series, tongues extending from said slots and overlying said edges and holding said edges in firm engagement with said cover member adjacent the ends of said slots, whereby said bead is effectively held in place on the cover member and entry of foreign matter through said slots to the tire is prevented.

6. The method of applying a strip of substantially C-shaped molding to a surface having one or more slots from whose ends tongues project, which comprises snapping the edges of said strip over said tongues until said edges are positioned between said tongues and said surface, and then spreading said tongues until the latter overlie said edges.

7. The method of applying a strip of substantially C-shaped molding to a surface having one or more slots from whose ends tongues project, which comprises snapping the edges of said strip over said tongues until said edges are positioned between said tongues and said surface, and then inserting a tool through said slot or slots and applying said tool to the respective tongue to force the latter to overlie each edge of the strip.

8. A flexible tire cover member expansible and contractible for application to and removal from a tire, and strip means for stiffening said member to impart thereto resilient characteristics not inherent in said member, said member having struck-up retaining means and said strip means having spaced edges disposed between and engaged by said means and said member.

9. A resilient sheet metal member, and means for stiffening said member to give the same the resilient characteristics of a thicker sheet metal member, said means comprising a resilient bead carried by and movable with said member, said member having a pair of resilient spaced cam elements and said bead having spaced edges adapted to engage and snap over the elements, said edges when in snapped-over position resiliently engaging said elements to inhibit rattling of the parts.

THEODORE J. W. TYSON.